Patented Aug. 21, 1923.

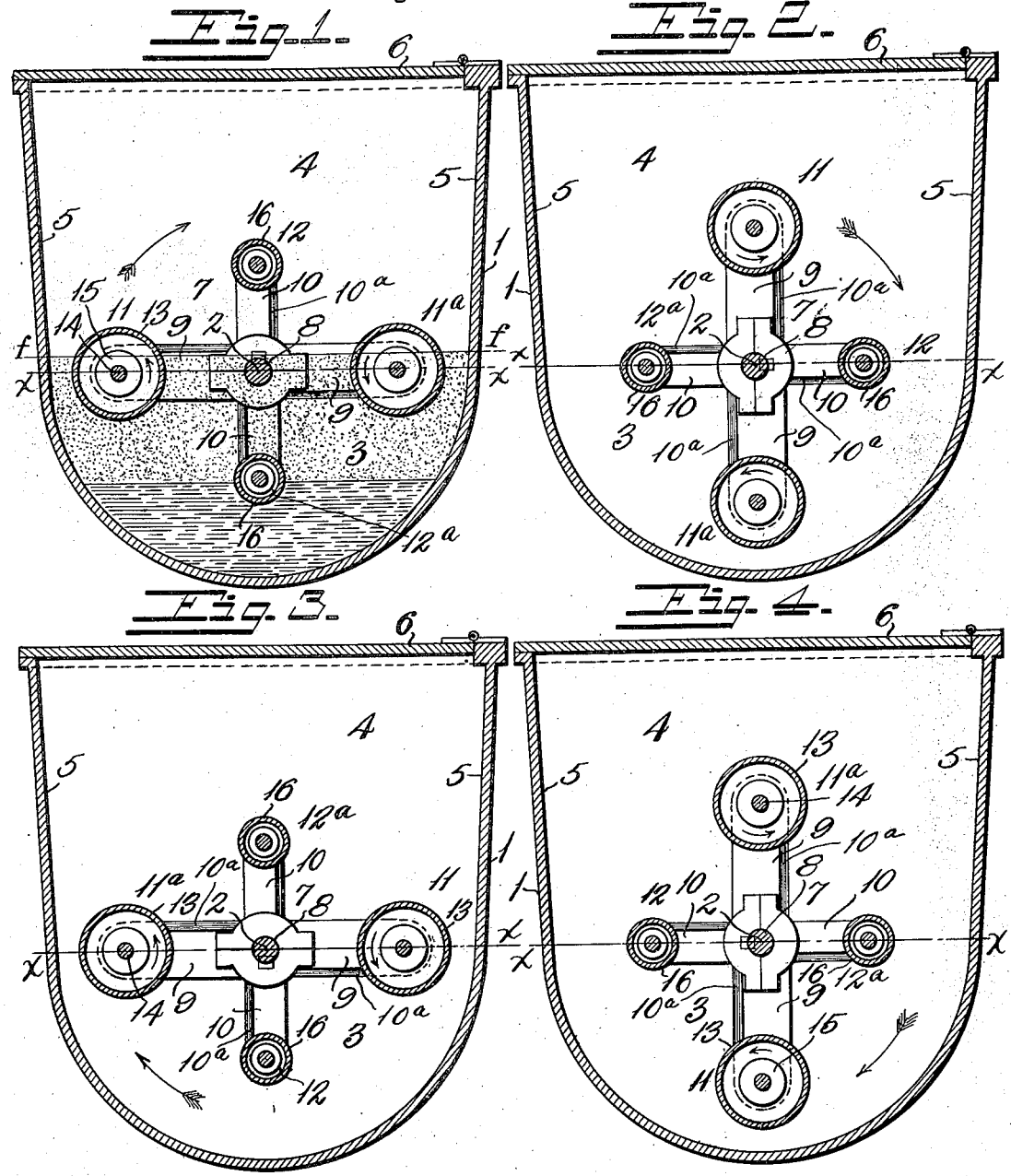
Aug. 21, 1923.
E. E. O'CONNELL
DOUGH MIXING MACHINE
Original Filed Oct. 19, 1920   2 Sheets-Sheet 1
1,465,917

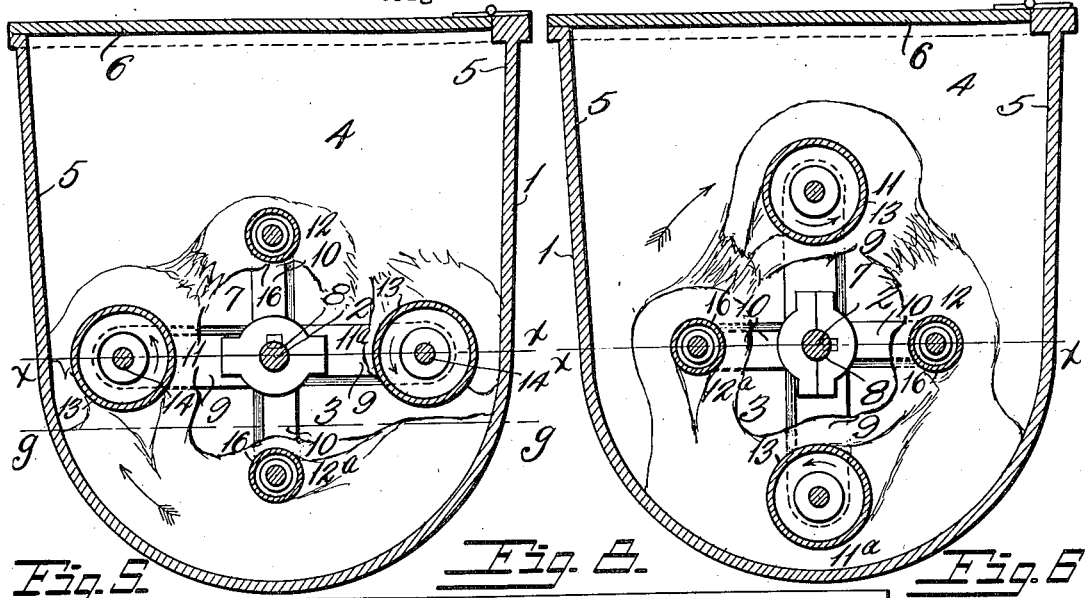
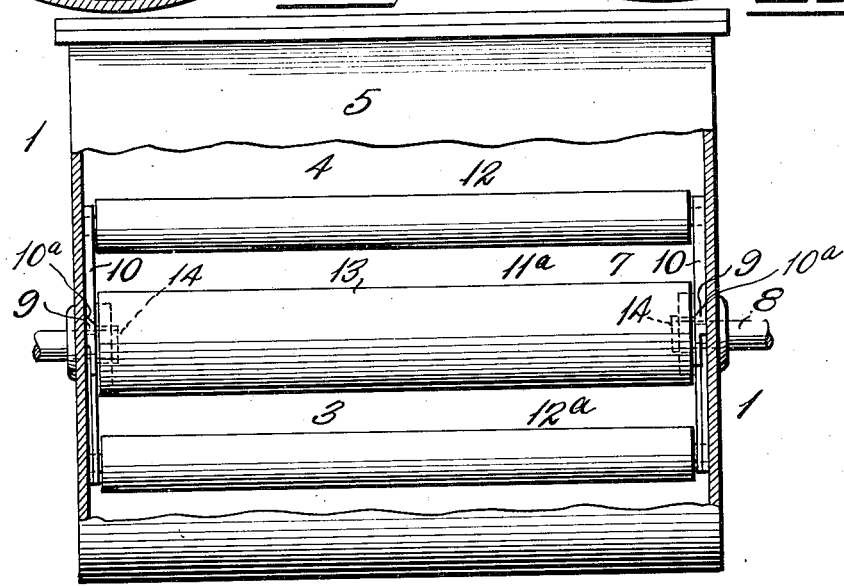

1,465,917

UNITED STATES PATENT OFFICE.

EDGAR E. O'CONNELL, OF WASHINGTON, DISTRICT OF COLUMBIA, ASSIGNOR TO THE CORBY BAKING COMPANY, A CORPORATION OF DELAWARE.

DOUGH-MIXING MACHINE.

Application filed October 19, 1920, Serial No. 417,916. Renewed July 12, 1923.

*To all whom it may concern:*

Be it known that I, EDGAR E. O'CONNELL, a citizen of the United States, residing at Washington, in the District of Columbia, have invented certain new and useful Improvements in Dough-Mixing Machines, of which the following is a specification, reference being had therein to the accompanying drawing.

This invention relates to an improved method for mixing together the initial ingredients of a dough mass, and for continuing, after the dough commences to become a stiffened body, the treatment in such way that the homogeneous commingling of the ingredients can be carried still further and the dough mass be subjected to a stretching action.

The invention also relates to an improved mechanism by which the method can be carried out.

After the initial ingredients have been introduced into the receptacle they constitute a miscellaneous mass of flour, water, and other bodies. The hydrating of the flour should be accomplished in as short a period of time as possible in order to properly develop the gluten contents and not have it exposed for a long period prior to introducing it to the troughs.

In order that the invention may be readily understood, a mass can be had in mind which contains the following ingredients: water, 126 pounds; fat, 3 pounds; cane sugar, 4 pounds; salt, 4 pounds; flour, 200 pounds; milk (in original condition) 60 pounds; or milk (condensed) 12 pounds, and yeast 2 pounds.

A number of methods have been heretofore proposed or suggested for accomplishing the work of first mixing the initial ingredients of such a dough mass and then treating the dough prior to introducing it to the troughs. For one of these methods various mechanisms have been used, differing one from another in some respects, but similar to each other as concerns the devices which pass through the dough. The receptacle was, generally, an elongated bowl, the lower part of which was approximately a semi-cylinder and with side and end walls extended up to a plane considerably above the axis. In the bowl was positioned a rotary element which comprised a central shaft mounted at the axis of the receptacle and carrying spiders adjacent to the end wall with thin rods or bars supported at their ends in the spiders. The relations of the parts were such that the thin rods would cut through the flour at the top of the initial charge and then, as they moved downward, they passed through the mass of water initially at the bottom of the receptacle; and then, in their continuing rotation, they moved upward again through the flour, and then through the empty upper part of the receptacle; this rotary movement of the relatively thin rods being intended to cause the commingling of the ingredients of the mass. And, after the stiffened dough body commenced to be formed, these rotating rods were designed to engage with the stiffened mass and act to cut bodily through it in such way that the mass is turned into filaments or fine shreds; this continuing until the mass is emptied into the troughs.

The other method has been carried out by peculiarly constructed devices; the design being to form, as quickly as possible, an integral mass, and then carry it bodily around the axis, and subject it to a kneading pressure applied at its inner surface while resisted by the wall of the receptacle. This wall was carried around the sides and the upper part of the receptacle to conform to a cylinder; but the bottom was flattened, that is to say was formed as a wide flat section positioned in a plane tangential to the paths of the rotary devices, and situated so as to arrest the integral mass at each revolution and arrest it while the rotary devices pass over, and contact with, its upper surface. These devices consisted of rods or rollers parallel to the axis, traveling close to the flat bottom, or tangential section of the circle, but, at the top of the receptacle, moving on lines parallel to the cylindrical cover. The integral mass, formed immediately after the commencement of the treatment, was pushed bodily around the axis, as described, and pressed against the inner surface of the receptacle wall at the top as well as at the sides, with the expectation of effecting, finally, the thorough intermingling of the components of the mass without separating one part of it from the other. Machines of this sort are subjected to interruptions, and intermittent increases, in the application of power. Each of the rods or rollers experiences wide variations in its work according as it is moving along the parallel top or vertical sides of the receptacle and then along the flattened bottom. And a thorough commingling of the ingredients can not be effected by a mere kneading action as quickly as by the mechanism which I have devised.

My aim is to effect a rapid commingling or mixing of the ingredients so as to have them uniformly distributed, immediately, throughout the mass, as an entirety, and at the same time subject the different parts of it to a lifting action in such way that they will be more or less separated from each other and from the mass as an entirety, (in contradistinction from their being formed quickly into an integral mass), and yet not torn into fine shreds.

Figure 1 is a vertical transverse section of a mechanism embodying my improvements by which my method of forming a dough mass can be carried out.

Figure 2 is a section showing the relative positions of the movable parts at the end of the first quarter of a revolution from the position shown in Figure 1.

Figures 3 and 4 are sections showing the movable parts at the ends, respectively, of the second and third quarters of a revolution.

Figures 5 and 6 illustrate successive positions of the rotary parts during later revolutions of treatment of a batch.

Figure 7 is a side elevation, partly in section of the rotary element.

Figure 8 is a side view of the mixing bowl, part of the side wall being broken away.

In the drawings:

The receptacle 1 is shown as a deep trough with a length dimension somewhat greater than its width. It comprises two main elements 3, 4, one extending down from the horizontal planes $x$, $x$ of its axis 2, and the other extending upward therefrom. It is formed of sheet metal curved in such way that the lower part 3 is semi-cylindrical in form, the upper part 4 having two side walls 5, 5, which are approximately vertical or slightly tapering, and extends up in parallel vertical planes to a horizontal plane considerably above that of the axis 2.

6 indicates a cover for closing the wide opening at the top.

In this receptacle there is mounted a rotary element. It is indicated as an entirety by 7 and comprises the longitudinal shaft 8, radially positioned arms or carriers 9 and 10 projecting from the shaft, and longitudinally extended devices 11, 11ª and 12, 12ª, carried by the arms. The arms 9 and 10 can be integral and in the form of a spider, or they can be formed separately and rigidly attached together and to the shaft 8. The arms 9, 9 are relatively considerably longer than the arms 10, 10 and are in axial planes at right angles to the planes of the latter.

Each of the longitudinally positioned devices 11, 11ª comprises a large roller 13, supported by trunnions or short stud shafts 14, each mounted on an arm 9. Each large roller is formed of a tube of long transverse diameter with heads 15 inserted in its ends, these heads carrying the trunnions or stud shafts 14. It extends from one end of the receptacle to the other, that is it is mounted in two of the opposing arms 9.

Each of the other longitudinally positioned devices 12, 12ª is closer to the axis than the rollers 13 and preferably comprises a small roller 16 rotatably mounted in two of the arms 10, 10.

When the shaft is rotating the larger rollers 13 revolve around the axis 2 in circles of long radii while the smaller rollers 16 revolve in circles of much shorter radii; the rollers 13 and 16 thus act on substantially all portions of the contained mass and effect a very thorough mixing. The rollers 13, when they reach the horizontal plane indicated by the lines $x$, $x$, come comparatively close to the semi-cylindrical wall of the bottom part 3 of the receptacle; and they continue to travel in this parallel relationship around the bottom of the receptacle and up to the horizontal plane of the axis.

The rollers, it will be seen, are so large that their diameters coincide with a long part of the radius from the main axis 2. The rollers 16, although smaller than those at 13, are, in diameter, much larger than the rods or bars that have been ordinarily used and which serve to shred the dough mass. Each of the rollers 13 and 16 is mounted so as to very freely revolve on its trunnions or stud shafts 14, even when the rotary system is revolved at the high speed which I employ of from seventy to seventy-five revolutions per minute.

When the ingredient materials, proportioned as above indicated for a dough mass, are initially introduced into the receptacle, they respectively occupy separate and more or less well defined regions, as indicated in Fig. 1, the mass of water being at the botton of the receptacle while the flour floats upon it and extends upwardly to approximately the line $f$, $f$, Fig. 1.

After the rotary system 7 is started to revolve the rollers 13 of the elements 11 and 11ª successively move from the positions shown in Figs. 1 and 2, rapidly pressing horizontal wide flour masses downward into the water, and lifting masses of water upward on the side of the vehicle where they rise. Even the rollers of the elements 12, 12ª carry large masses of the ingredients down and up, they moving in paths closer to the axis 2 than the large rollers. Within two or three minutes there is a practically complete mixture of the various components and the water is so thoroughly distributed, and the flour ingredients so quickly hydrated, that the development of gluten commences uniformly, practically, throughout the entire mass. For the succeeding four or five minutes this disseminating and distribution of the ingredients throughout the mass is enhanced by the action of the lifting elements at 11, 11ª and 12, 12ª, they successively picking up large masses (without shredding or forming sheets of the agglomerating body), and carrying them around the axis; this insuring that the interior particles of the masses will be sufficiently exposed to effect the hydrating rapidly.

As soon as the mass has reached the consistency or condition where it tends to form an integral body of dough, the rotary system of parts is stopped and the dough is ready for emptying into the troughs.

Because of their large size, the rollers, although moving through the mass, (some of it passing over their tops), do not act to cut it into shreds or sheets, but rapidly lift it while moving through it bodily. After the initial commingling of the water with the flour, the mass, as an entirety, occupies the space below the line indicated by $g, g$. From this space the stiffened material is lifted by the rollers into the free upper chamber 4, 4, the walls of which are so designed as to have no pressure exerted upon the dough while being carried around and above the axis.

Since the rollers 13 and 16 travel in distinct paths, substantially all portions of the mass are acted upon. Moreover, by alternately arranging the members of the pairs of rollers, the action of the pairs of rollers upon the portions of the mass in their respective paths along the bottom of the trough is intermittent, permitting the portions of the mass in the respective paths to thicken between the successive strokes of the rollers in the same path. This is particularly desirable in the case of the larger rollers 13 which travel close to the bottom of the trough, and serve to compress and knead the dough, as well as to lift the same.

In a mechanism of the sort described, properly used under the conditions mentioned, I uniformly prepare the successive masses each in from six to eight minutes, ready for delivery to the troughs.

What I claim is:

1. A mechanism for initially mixing the flour, water, and other ingredients of a dough mass and preparing it for the troughs, having in combination a bowl and a rotary mixing and agitating element, the latter comprising a pair of diametrically opposed horizontal freely rotating rollers of relatively large diameter equi-distant from the axis of rotation, and a pair of relatively smaller horizontal rollers each midway between the large rollers and equi-distant from the axis, and the bowl having the bottom and lower parts of its side walls curved to be concentric throughout with the axis of the rotary element and positioned at a distance from the paths of the said large rollers to provide a dough compressing and kneading space, and having the wall of its upper part arranged to permit the dough to pass through the upper part of its path without pressure or resistance therefrom.

2. A mechanism for initially mixing the flour, water and other ingredients of a dough mass and preparing it for the troughs, having in combination a bowl and a rotary mixing and agitating element, the latter comprising a pair of diametrically opposed horizontal freely rotating rollers of relatively large diameter equidistant from the axis of rotation, and a pair of relatively smaller horizontal rollers each midway between the large rollers and equidistant from the axis, the axes of said pair of smaller rollers being closer to the axis than the axes of the larger rollers, and the bowl having the bottom and lower parts of its side walls curved to be concentric throughout with the axis of the rotary element, and positioned at a distance from the paths of the said large rollers to provide a dough compressing and kneading space, and having the wall of its upper part arranged to permit the dough to pass through the upper part of its path without pressure or resistance therefrom.

3. In a mechanism for initially mixing the flour, water and other ingredients of a dough mass and preparing it for the troughs, a rotary mixing and agitating element comprising a pair of substantially diametrically opposed horizontal freely rotating rollers of relatively large diameter and substantially equidistant from the axis of rotation, and a pair of relatively small horizontal freely rotating rollers each substantially midway between the large rollers and substantially equidistant from the axis.

4. In a mechanism for initially mixing the flour, water and other ingredients of a dough mass and preparing it for the troughs, a rotary mixing and agitating element comprising a pair of substantially diametrically opposed horizontal freely rotating rollers of relatively large diameter and substantially equidistant from the axis of rotation, and a pair of relatively small horizontal freely rotating rollers each substantially midway between the large rollers and substantially equidistant from the axis, the axes of said last mentioned pair of rollers being closer to the axis of rotation than the axes of the larger rollers.

5. In a mechanism for initially mixing flour, water, and other ingredients of a dough mass and preparing it for the troughs, a rotary mixing and agitating element comprising a shaft, supporting means adjacent the opposite ends of said shaft, a pair of relatively large horizontal freely rotating rollers extending between and supported by said means, and a pair of horizontal cross-bars each between said rollers and closer to said shaft than the rollers, said cross bars extending between and supported by said means.

6. A mechanism for initially mixing flour, water, and other ingredients of a dough mass and preparing it for the troughs, having, in combination, a bowl and a rotary mixing and agitating element, the latter comprising a pair of horizontal freely rotating rollers of relatively large diameter substantially equidistant from the axis of rotation, and a pair of horizontal cross-bars paralleling said rollers, each between the rollers and closer to the axis of said element than the rollers, and the bowl having the bottom and lower parts of its side walls curved to be concentric throughout with the axis of the rotary element and positioned at a distance from the paths of said rollers to provide a dough compressing and kneading space and having the wall of its upper part arranged to permit the dough to pass through the upper part of its path without pressure or resistance therefrom.

In testimony whereof I affix my signature.

EDGAR E. O'CONNELL.